United States Patent
Bartelt et al.

(10) Patent No.: US 6,655,205 B2
(45) Date of Patent: Dec. 2, 2003

(54) CONTINUOUS MEASUREMENT FOR DETERMINING A SUITABLE MOUNTING POSITION OR FOR QUALITY-TESTING OF GEAR SETS

(75) Inventors: Volker Bartelt, Leuggern (CH); Christian Pahud, Zürich (CH)

(73) Assignee: Oerlikon Geartec AG, Zurich (CH)

( * ) Notice: Subject to any disclaimer, the term of this patent is extended or adjusted under 35 U.S.C. 154(b) by 0 days.

(21) Appl. No.: 10/054,152

(22) Filed: Jan. 21, 2002

(65) Prior Publication Data

US 2002/0129647 A1 Sep. 19, 2002

(30) Foreign Application Priority Data

Mar. 13, 2001 (EP) .............................................. 01106105

(51) Int. Cl.⁷ ............................................. G01M 13/02
(52) U.S. Cl. ......................................... 73/162; 702/113
(58) Field of Search .............................. 73/162; 702/113

(56) References Cited

U.S. PATENT DOCUMENTS

| | | | |
|---|---|---|---|
| 1,981,693 A | * 11/1934 | Firestone et al. | 73/593 |
| 2,582,408 A | * 1/1952 | Bauer | 451/114 |
| 3,405,557 A | * 10/1968 | Sinke, Jr. | 73/162 |
| 3,528,286 A | * 9/1970 | Bergemann et al. | 73/162 |
| 3,611,800 A | * 10/1971 | Howlett et al. | 73/162 |
| 4,586,373 A | * 5/1986 | Muller et al. | 73/162 |
| 4,831,872 A | * 5/1989 | Huang et al. | 73/162 |
| 5,113,704 A | * 5/1992 | Yano et al. | 73/162 |
| 5,219,389 A | * 6/1993 | Gutman | 73/162 |
| 5,307,676 A | 5/1994 | Gutman | 73/162 |
| 5,511,414 A | * 4/1996 | Nakamura et al. | 73/162 |
| 5,609,058 A | * 3/1997 | Gnadt et al. | 73/162 |
| 5,901,454 A | * 5/1999 | Stadtfeld et al. | 33/501.13 |

OTHER PUBLICATIONS

H. Stadtfeld, "A New Method for Testing and Optimizing Bevel Gears", VDI—Periodical, pp. 176–177, 133 (Jun., 1991 No. 6, Dusseldorf, Germany ( and English Translation (2 pages)).

* cited by examiner

Primary Examiner—Helen Kwok
Assistant Examiner—David A. Rogers
(74) Attorney, Agent, or Firm—McCormick, Paulding & Huber LLP

(57) ABSTRACT

A system for determining the suitable positioning of a first gear wheel in relation to a second gear wheel. The system comprises an evaluation unit and a roll-of device, which contains a first spindle for the rotatable seating of the first gear wheel, a second spindle for the rotatable seating of the second gear wheel and a drive mechanism for rotating the first gear wheel and a drive mechanism for acting with a positive or a negative torque on the second gear wheel. The roll-off device furthermore has a displacement device for changing the positioning of the first gear wheel in relation to the second gear wheel. A measurement pick-up device and two angle encoders are provided in the roll-off device and are connected with the evaluation unit. The evaluation unit processes coordinate information S(X, Y, Z), which describes the positioning of the first gear wheel in relation to the second gear wheel, the continuous signal from the measurement pick-up device, and signals from the two angle encoders, in order to determine the suitable positioning.

32 Claims, 6 Drawing Sheets

CONTINUOUS MEASUREMENT FOR DETERMINING A SUITABLE MOUNTING POSITION OR FOR QUALITY-TESTING OF GEAR SETS

FIELD OF THE INVENTION

The invention relates to a method for determining a suitable mounting position, or for quality-testing of gear sets, as well as an appropriate device, an evaluation unit and a software module for executing the method. The invention is used in particular for determining the suitable mounting position of a gear set, such as is used in transmissions.

BACKGROUND OF THE INVENTION

Gear wheels are used in various technical fields. Customarily a first gear wheel meshes with a second gear wheel. To assure the neat roll-off of the gear wheels, it is important to bring the two gear wheels into a relationship with each other in a spatial coordinate system in a suitable manner during the mounting.

A typical example of two meshing gear wheels is a gear in which a ring gear (as the first gear wheel) and a pinion gear (as the second gear wheel) act together as a gear set. In order to assure a neat roll-off behavior of the pinion along the ring gear, a suitable mounting position, typically in the form of so-called mounting measures, is determined prior to the assembly of the gear. These mounting measures are then realized as accurately as possible during the assembly.

A measuring method is known which is used for determining the mounting measure. In accordance with the known method, the gear set is brought into engagement, and several discrete installed positions (mounting points) are sequentially set. A measurement is performed at each of the discrete mounting points in accordance with this known method. A structure-borne sound measuring curve, or a single-flank transmission error measurement curve is recorded in each one of these mounting positions. An evaluation by computer of the mounting position is performed from the various structure-borne sound measuring curves, and a suitable mounting position is determined. Predetermined characteristic values can be taken into consideration and weighted in the course of the computer-aided evaluation. A disadvantage of this method is that it is relatively time-consuming to approach the individual mounting positions and then to perform a structure-borne sound analysis of single-flank transmission error measurement in every installed position.

The single-flank transmission error measurement (SFT) allows the comparison of the rotary motion of the two spindles (or of the gear wheels seated on the spindles). By means of the SFT it is possible, for example, to obtain information regarding the meshing of the teeth. Customarily a short-wave signal portion is recognized in the total signal from the SFT, which stems from the tooth geometry, and a long-wave portion, which is to be put down to an eccentricity or deviations between the wheel geometry of the two gear wheels.

SUMMARY OF THE INVENTION

The object is to develop a measuring equation which allows a faster determination of the suitable mounting position of gear sets or a quality test of gear sets.

It is a further object of the present invention to make available a measuring system which is suitable for the rapid determination of the suitable mounting position of gear sets or for the quality test of gear sets.

It is a further object of the present invention to make available a method, a device, an evaluation unit and a software module, which are suitable for determining a suitable mounting position for the mounting of wheel sets pairs as rapidly as possible.

It is a further object of the present invention to make available a method, a device, an evaluation unit and a software module, which are suitable for performing a quality test of gear sets as rapidly as possible.

This object is attained in accordance with the invention by means of a device in accordance with claim 1, or by a method comprising the steps recited in claim 22, or by a software module as recited in claim 30, or by an evaluation unit as recited in claim 31.

It is an advantage of the method in accordance with the invention that it permits a test of gear sets without considerable additional time. In contrast to the measuring method described at the outset, wherein measurements are only performed at discrete mounting points, the method in accordance with the invention allows a considerably shorter measuring process. This is of commercial importance, since with a shortened measuring process it is possible to improve the efficiency of the testing system and its throughput.

Advantageous embodiments of the device in accordance with the invention are the subject of claims 2 to 21.

Further advantageous embodiments of the method in accordance with the invention are recited in claims 23 to 29.

BRIEF DESCRIPTION OF THE DRAWINGS

Exemplary embodiments of the invention are described in greater detail in what follows, making reference to the drawings. Shown are in.

DETAILED DESCRIPTION OF THE PREFERRED EMBODIMENT

For the sake of simplicity, gears and gear sets are mainly mentioned in the present description. In the description, the term wheel set is used as a generic term for every type of gear wheel, spur wheel, bevel wheel (for example the bevel gears), ring gear, pinions, etc. The present invention is particularly suited for the testing of axially displaced and non-axially displaced bevel wheel gears. In this connection it is unimportant whether these are gear wheels with interior teeth or with exterior teeth, or whether the gear wheels are spur- or helically-toothed.

The suitable positioning of a gear set (for example two gear wheels) is repeatedly mentioned in the present description. It should be noted that the suitable position can depend on various prerequisites. If the gear set is a helical bevel gear intended to be installed in a truck, other criteria are used than with a helical bevel gear for mounting in a small car. Moreover, every user has different prerequisites, or definitions, which are used in the determination of the suitable positioning of gear sets, or in the quality tests thereof.

A suitable mounting position can occur, for example, when the structure-borne sound is the lowest, wherein a low structure-borne sound normally assures quiet running. Other areas of use possibly dictate other prerequisites in respect to the suitable mounting position. For example, the durability or the running properties of the gear can be important criteria when defining the suitable mounting position.

Figure 1:
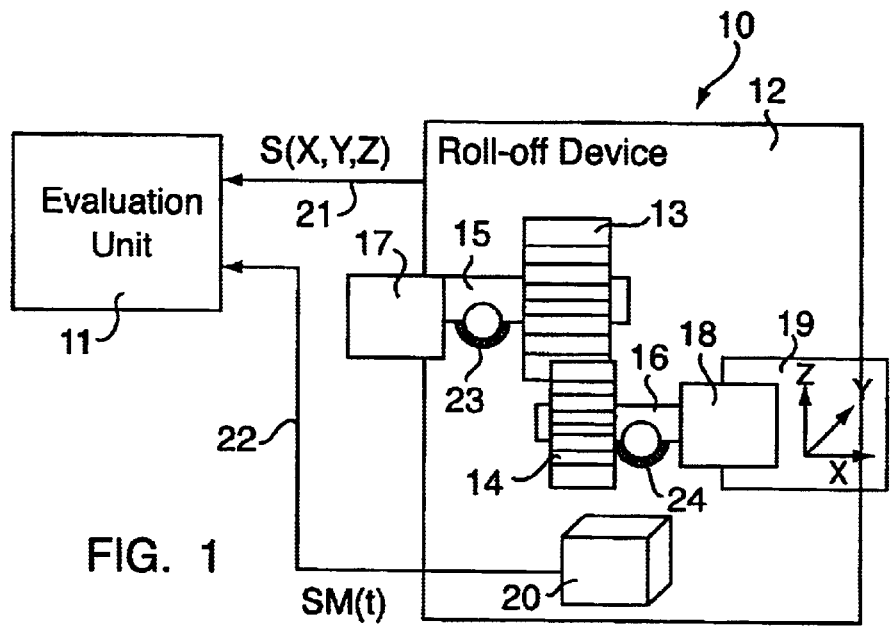
FIG. 1, schematically illustrates a system made in accordance with the present invention, FIG. 2, schematically illustrates a gear set which can be tested in a system in accordance with the present invention.

A first exemplary embodiment of the present invention will be described by means of the schematic representation in FIG. 1. A system 10 is schematically shown in this figure, which essentially consists of an evaluation unit 11 and a roll-off device 12. Such a system 10 can be employed, for example, for testing a gear wheel pair 13, 14. In the course of the test in accordance with the invention, the suitable positioning of the first gear wheel 13 in relation to the second gear wheel 14 is determined.

The roll-off device 12 represented comprises a first spindle 15, on which the first gear wheel 13 can be fastened. The first spindle 15 is caused to rotate around the spindle axis by a drive mechanism 17. The second gear wheel 14 is seated on a second spindle 16. A second drive mechanism 18 is provided on the second spindle 16 in order to act on the second spindle either with a positive torque (traction mode) or a negative torque (thrust mode). In order to be able to bring the two gear wheels 13 and 14 into engagement, the roll-off device has a positioning unit 19 which can be used for changing the positioning of the two gear wheels 13, 14 relative to each other. As graphically indicated by the X, Y, Z coordinate system shown as the positioning unit 19, positioning can take place in a three-dimensional space. The position of the two gear wheels 13 and 14 relative to each other is not described in the Cartesian coordinate system, but in the V, H, J coordinate system.

Figure 2:
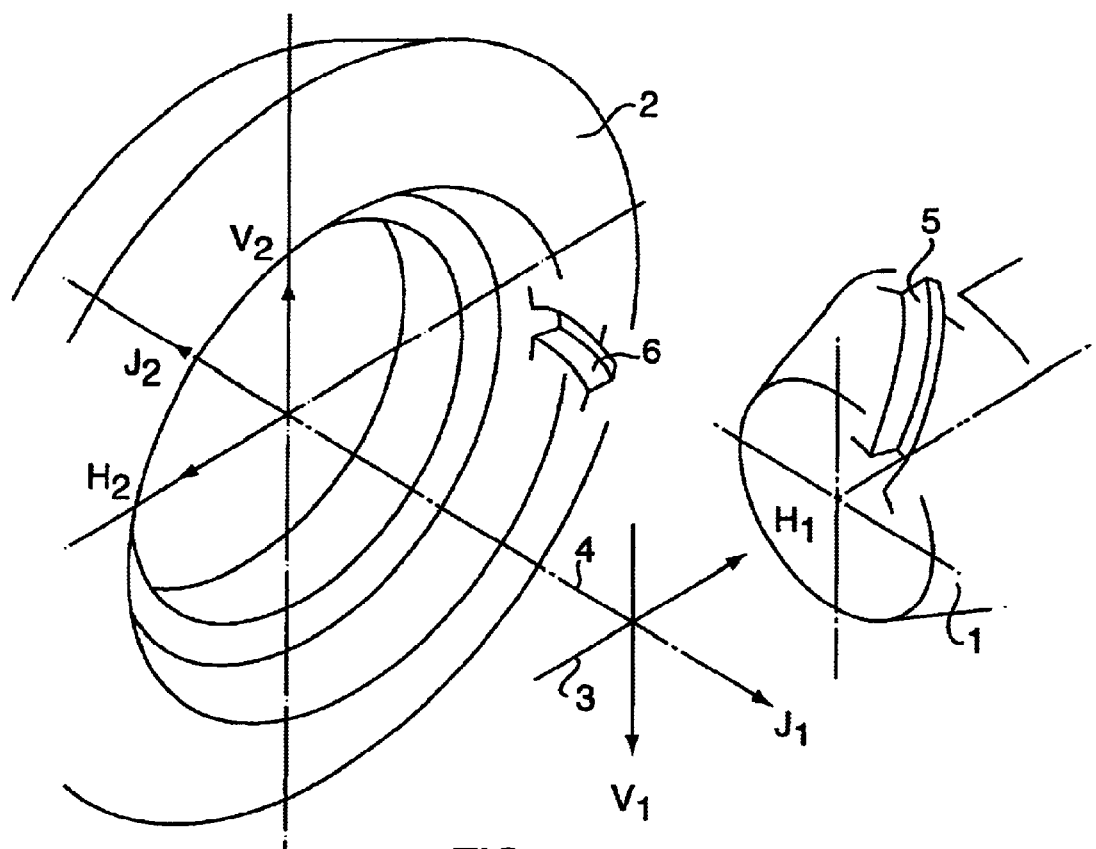

A bevel wheel 1 (pinion gear) with an associated ring gear 2 is represented in FIG. 2. The axis of rotation 3 of the bevel wheel 1 and the axis of rotation of the ring gear 2 extend substantially perpendicularly relative to each other in the drawing figure shown. An individual V, H, J coordinate system is defined for each one of the wheels. The V, H, J coordinate system of the bevel wheel 1 is provided with the index 1, while the V, H, J coordinate system of the ring gear 2 is provided with the index 2. It is possible to calculate the positioning of the bevel wheel 1 in relation to the one of the ring gear 2 by means of these two V, H, J coordinate systems. For the sake of simplicity, only two teeth 5, 6 are indicated in FIG. 2.

Since it is not essential for the invention which coordinate system is used for describing the positions of the gear wheels, the term positioning will be mainly used in what follows, which is intended to state that in the end only the position of the one gear wheel relative to the position of the other gear wheel is important.

The roll-off system 12 represented is capable of sending signals S(X,Y,Z) to the evaluation unit 11 via a communication connection 21. The signals S(X,Y,Z) describe the positioning of the gear set to be tested. The use of the symbols X, Y, Z is intended to indicate that it is here also possible to describe the positioning by means of the coordinates of a coordinate system. The roll-off device 12 furthermore includes a measurement pick-up device 20, which transmits a time-dependent measuring signal SM(t) to the evaluation unit 11 via a communication connection 22. The communications connection 22 is preferably a connection by means of a shielded cable. Depending on the field of application of the system 10, this can be an active or a passive structure-borne sound sensor 20, for example. Such a structure-borne sound sensor 20 generates an analog signal, which provides information regarding the sound properties, or the acceleration of the two gear wheels 13, 14 while they roll off on each other. Thus, the structure-borne sound sensor 20 measures the oscillation properties and by means of this permits a statement regarding the nature of the test pieces 13, 14. The signal SM(t) of the structure-borne sound sensor 20 is typically proportional to the forces acting on them and is preferably processed by a measuring amplifier and/or other components for signal adaptation. The amplifier can either be connected upstream of the evaluation unit or integrated in it. As schematically indicated in FIG. 1, besides the measurement pick-up device 20, an angle encoder 23, or 24, is respectively provided on each spindle. These are preferably high-resolution angle encoders.

Figure 3:
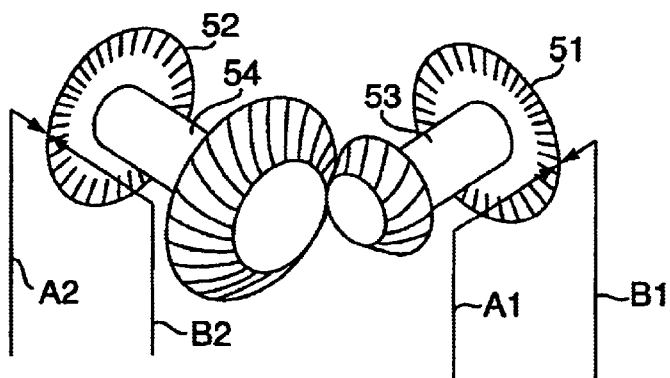
FIG. 3, shows a gear set with angle encoders in accordance with the present invention, FIG. 4, schematically illustrates the flank of a first gear wheel and the flank of a second gear wheel.

Details for the typical arrangement of two angle encoders 51 and 52 can be taken from FIG. 3. As indicated in FIG. 3, the angle encoders 51, 52 can be coupled directly on the spindles 53, 54. The optical disks shown of the angle encoders 51, 52 preferably have a resolution of several thousand pulses. For example, the angle encoders 51, 52 can offer the channels A1, B1 and A2, B2, typical for pulse encoders, for counting pulses and for acquiring position directions and directions of rotation. The angle encoders 51, 52 can be either connected mechanically with the spindles 53, 54 as shown, or coupled inductively, or optically.

In addition to the explicitly represented components, the system 10 has a control device, which is preferably able to perform the following steps:

Displacement of the gear wheels 13, 14 in respect to each other until they are in engagement and an initial position (also called zero position) has been reached.

Driving one of the two gear wheels 13 or 14 for putting them into a rotatory motion, in which both gear wheels 13, 14 roll off on each other. In this case the gear wheels can be driven at a constant number of revolutions n, or at a chronologically varying number of revolutions n(t).

Displacement of the gear wheels 13, 14 in respect to each other, wherein the displacement is predetermined by a displacement factor $\vec{V}$ (t)(2- or 3-dimensional).

In addition to these steps, the control device can generate various load modes (traction and thrust), so that measurements can be performed in the traction mode, as well as in the thrust mode. The load modes can be preset, for example in the form of load stages. After a defined length of time a switch is preferably made from the traction mode to the thrust mode (or vice versa). This can take place, for example, by the appropriate triggering of the second drive mechanism.

While the two gear wheels 13 and 14 roll of on each other and are displaced in respect to each other, the measurement pick-up device 20 transmits the measuring signal SM(t) to the evaluation unit 11. The transmitted measuring signal SM(t) is a continuous measuring signal, which is picked up during the entire time of the process. The angle encoders 23 and 24 provide information to the evaluation unit 11 in addition to the measuring signal SM(t). In accordance with the present invention, the signal SM(t) is put into a relationship with the positioning information S(X,Y,Z). To achieve this it is possible to synchronize the signal with the positioning information S(X,Y,Z). It is important to provide such a relationship between the positioning information S(X,Y,Z) and the recorded signals in order to be able to determine the suitable mounting position of the tested gear set 13, 14 by computer, or for making possible a statement regarding the quality of a gear set to be tested. The positioning information S(X,Y,Z) can be either measured in the course of the displacement of the gear wheels 13, 14 and transmitted to the evaluation unit 11, or the positioning information S(X,Y,Z) can be electronically branched off the control device of the roll-off device (not represented).

The evaluation unit 11 evaluates the signals (for example (SM(t)) and the positioning information S(X,Y,Z) in the following manner. It is important in the course of the evaluation to take into account that it is a goal of the evaluation either to obtain conditions regarding the suitable positioning (mounting position) of the two gear wheels 13, 14 for their subsequent mounting, or to be able to judge the quality of a gear set.

A so-called ordering analysis is performed for the evaluation. To this end, several areas (blocks) are selected preferably from the continuously picked up time curve(s). It is possible to select for this for example several particular points (for example as a function of the time t and the location H) of the curve(s) and to define areas which include these particular points. In other words, the continuously picked up time curve(s) is split up into several blocks. A window function can be employed to split up the curve(s), which is multiplied in a suitable way with the time curve (for example SM(t)).

Possible direct current (d.c.) components (G) of the time curve(s) are preferably removed prior to the splitting into blocks by means of subtraction or another step.

It is the possible to determine frequency spectra, for example (by means of a suitable Fourier transformation, for example), so that it will be possible to determine, for example, the harmonic components from the ring gears (normally a relatively long-wave time signal), and/or the harmonic rotation components from the pinion gear, and/or the harmonic components from the gear engagement.

A characteristic value can be derived from every one of the blocks, which in turn defines a hypothetical curve. In a following step this hypothetical curve is preferably smoothed in order to improved the reproducibility of the evaluation.

In a further step of the evaluation, characteristic values are interpolated at positions defining the positioning of the two gear wheels in respect to each other. In the course of selecting a suitable interpolation algorithm, which is applied to the hypothetical curve, it is necessary to take into consideration that in actuality there is only a finite number of mounting positions of the two gear wheels 13, 14 of a gear set which can be realized, since the installed position is customarily defined by the mounting of spacers (spacing disks) when installing a gear. These spacers (called shims), however, are only available in quite definite thicknesses.

When determining the suitable mounting position it must therefore be taken into consideration that it is not possible to provide any arbitrary position during mounting. It is necessary here to determine the mounting position which can be achieved by means of spacing disks and which comes closest to the optimal mounting position.

The evaluation unit 11 can output the conditions for a suitable positioning of the two gear wheels 13, 14 on a display or a printer. Alternatively, or in addition, the conditions can be stored, or be made available via a communications connection for further processing.

Figure 4:
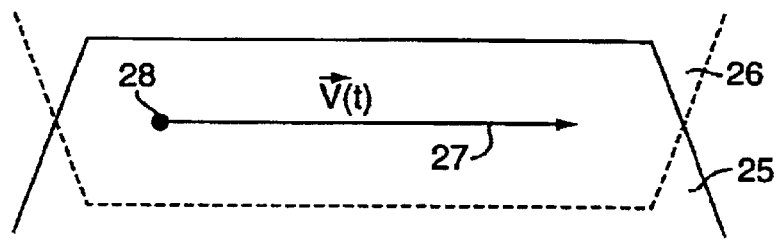

The displacement of the two gear wheels 13 and 14 in respect to each other is represented in FIG. 4. The flank of a tooth 26 of the gear wheel 13, and the flank of a tooth 25 of the gear wheel 14 are represented in FIG. 4. The displacement vector $27^V$ (t) is represented as an arrow, which shows the displacement of the gear wheel 13 in respect to the gear wheel 14. This displacement begins at a starting point 28 (zero point) and extends in the example represented parallel with the H-coordinate axis of the V, H, J coordinate system.

Figure 5:
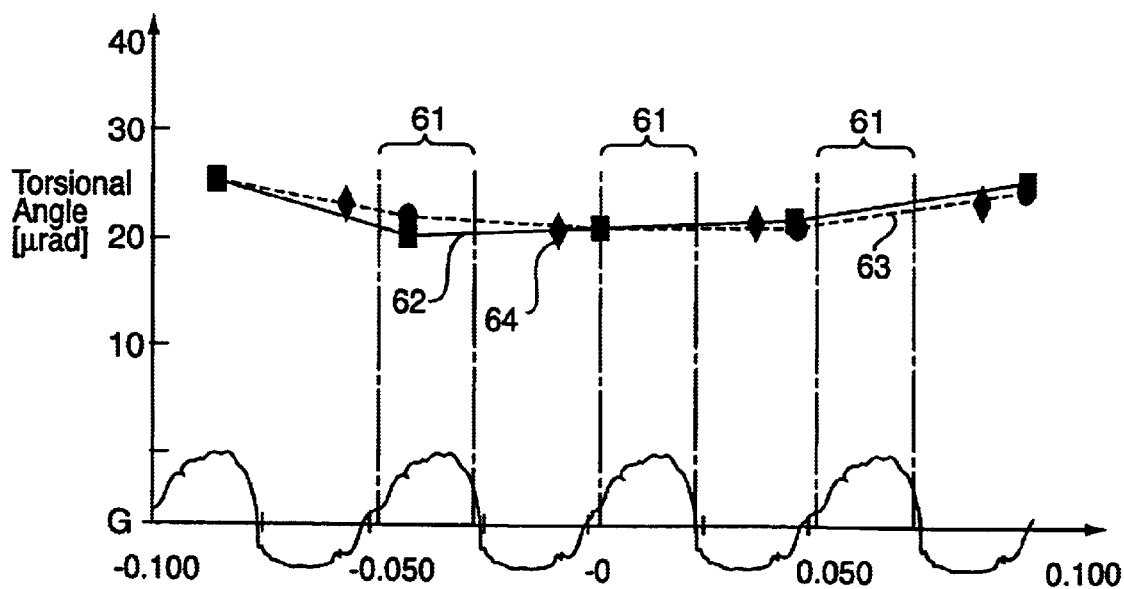
FIG. 5, is an example of a result of a measurement in the form of a curve plot in accordance with the present invention, FIG. 6, schematically illustrates a further system in accordance with the present invention.

In a further embodiment of the invention it is possible to measure the so-called single-flank working error by means of a single-flank transmission error measurement (SFT). The single-flank transmission error measurement allows the drawing of conclusions regarding rotational errors. The result of a single-flank transmission error measurement in accordance with the present invention is graphically represented in the schematic diagram in FIG. 5. The abscissa of the diagram describes the position of two gear wheels in mm. The ordinate represents the rotational error as a unit $\mu$rad (peak to peak). The signals of the two angle encoders are preferably subtracted from each other for forming a differential signal. This differential signal 60 describes the rotational error, which fluctuates up and down by the d.c. components (G). Several areas 61 (blocks) to be evaluated are selected from this continuously picked up rotational error curve 60. It is possible to select several special points on the rotational error curve 60 for defining the areas 61 (blocks) to be evaluated. At least one value is then respectively determined from each one of these blocks 61. In FIG. 5, these values are represented by gray rectangles. If these gray rectangles are connected, a hypothetical curve 62 (solid line) is obtained. These hypothetical curve 62 is now smoothed by computer. The smoothed curve 63 is obtained from this, whose course is represented by gray ovals. For the sake of improved clarity, the smoothed curve 63 is shown in dashed lines. A finite number of discrete points is now calculated from the smoothed curve 63 by means of an interpolation. These discrete points (represented as black lozenges) define the various mounting positions which can be obtained by the insertion of spacers when assembling the tested gear set. In the example represented in FIG. 5, the point 64 comes closest to the ideal mounting position. In other words, the point 64 corresponds to the suitable positioning in accordance with the invention.

Figure 6:
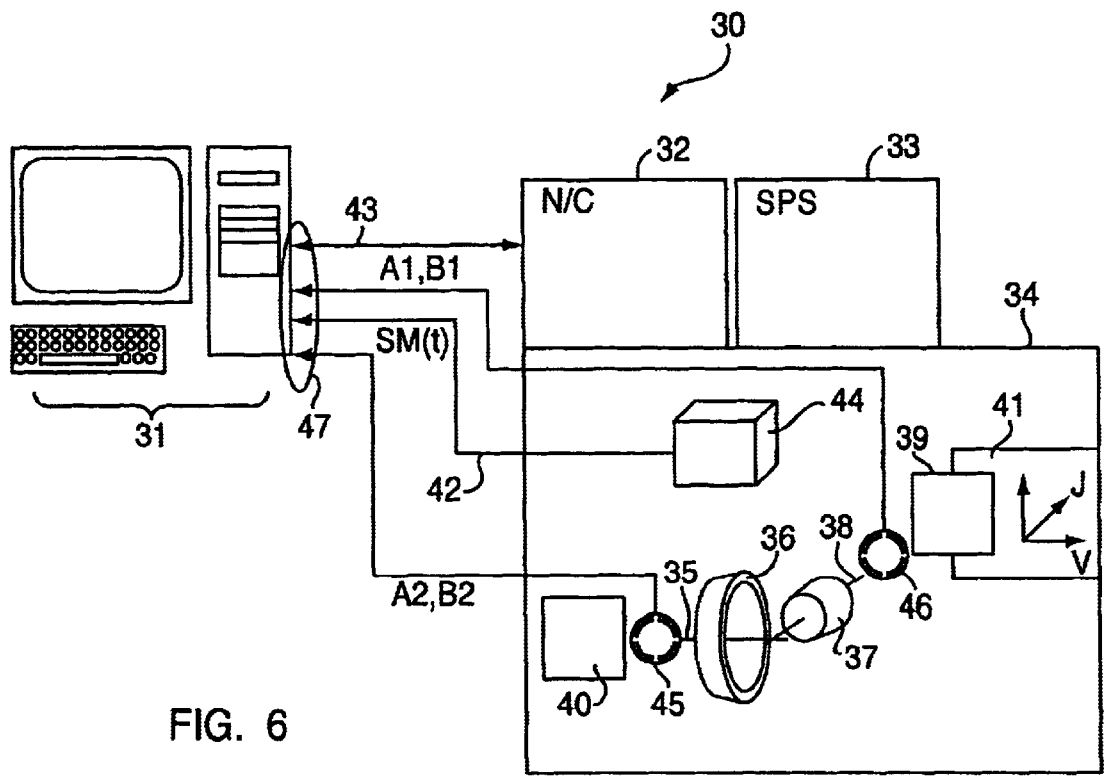

Another embodiment of the invention is represented in FIG. 6. The system 30 represented again has an evaluation unit and a roll-off unit. The roll-off unit comprises a track control device 32 (for example a numeric controller (N/C) device), a stored-program controllable system (SPS) 33 and a device 34. The track control device 32 is a computer-aided numerical control device. By means of the track control device 32 it is possible to provide the various required operational sequences of the roll-off device. The SPS 33 makes the control of the operational sequences possible. The device 34 comprises a first spindle 35, only represented by the spindle shaft), on which the first gear wheel 36 can be fastened. In the example shown, the first gear wheel 36 is a ring gear in a schematic representation. The first spindle 35 is caused to rotate around the spindle shaft by a drive mechanism 40. The second gear wheel 37 (in the illustrated case a pinion gear in a schematic representation) is seated on the second spindle 38. A second drive mechanism 39 is preferably provided on the second spindle 38 in order to act on the second spindle 38 either with a positive or a negative torque. For being able to bring the two gear wheels 36 and 37 into engagement, the device 34 has a positioning unit 41, which can be employed for changing the positioning of the two gears wheels 36, 37 in respect to each other. As graphically indicated by the H, V, J coordinate system, positioning can take place in three-dimensional space.

The roll-off system 32, 33, 34 represented is able to transmit signals S(H,J,V) to the evaluation unit 31 through a communications connection 43 employing a protocol such as TCP/IP. The signals S(H,J,V) describe the instantaneous positioning of the gear wheels 36 and 37. The roll-off device 32, 33, 34 furthermore comprises a measurement pick-up device 44, which transmits an analogous measuring signal SM(t) to the evaluation unit 31 through a communications connection 42 employing a protocol such as TCP/IP. A shielded cable is preferably used in order to suppress interfering effects. As schematically represented in FIG. 6, respectively one angle encoder 45, or 46, is provided on each spindle, besides the measurement pick-up device 44. The angle encoders 45 and 46 are also connected with the evaluation unit 31 through communications connections A1, B1, and A2, B2.

The evaluation device 31 preferably has input channels for the synchronous pickup of the position information S(H,J,V) (for example respectively one input channel for a analog V, H and J signal) and an input channel for the analog system from the measurement pick-up device for structure-borne sound 44. Preferably the analog input channels are equipped with A/D converters. The evaluation unit 31 preferably additionally has input channels for the signals from the angle encoders 45, 46. If incremental encoders are connected downstream of the angle encoders 45, 46, these input channels are designed to be digital. The input channels as a whole are identified by 47.

The evaluation unit 31 ideally comprises an evaluation module (for example in the form of an insert card) with digital signal processors (DSPs), which are designed for processing digital and analog signals.

The signals received by the evaluation unit 31 are preferably stored as gap-less time lines (time signals). A RAM (random access memory), for example, is suitable for this.

Besides the mentioned input channels and the evaluation module, the evaluation unit 31 includes a computer, which is preferably equipped with a tape drive, interfaces for peripheral devices, a display and a keyboard.

Figure 7A:
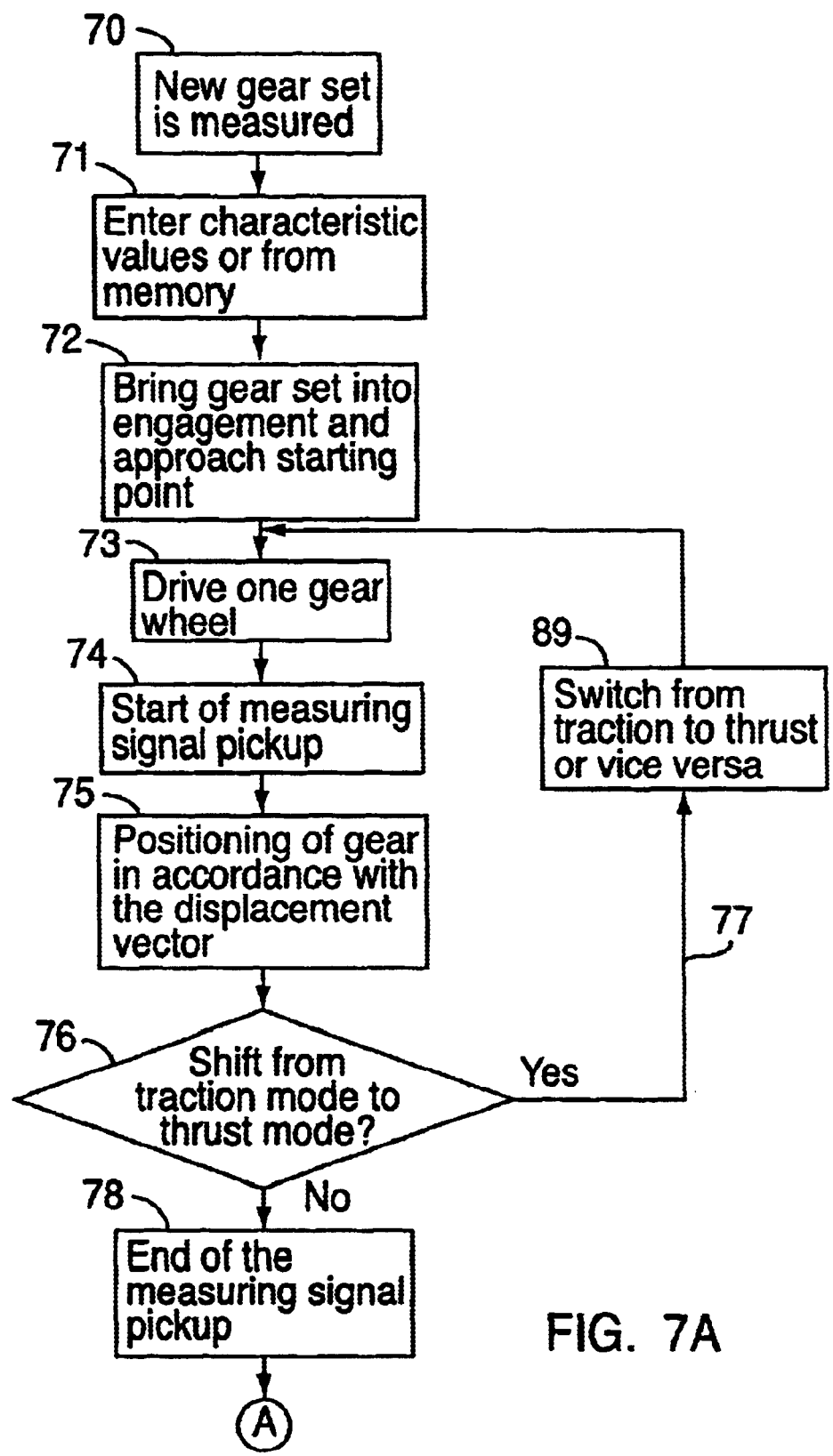
FIG. 7A, is a first portion of a flow diagram in accordance with the present invention.
Figure 7B:
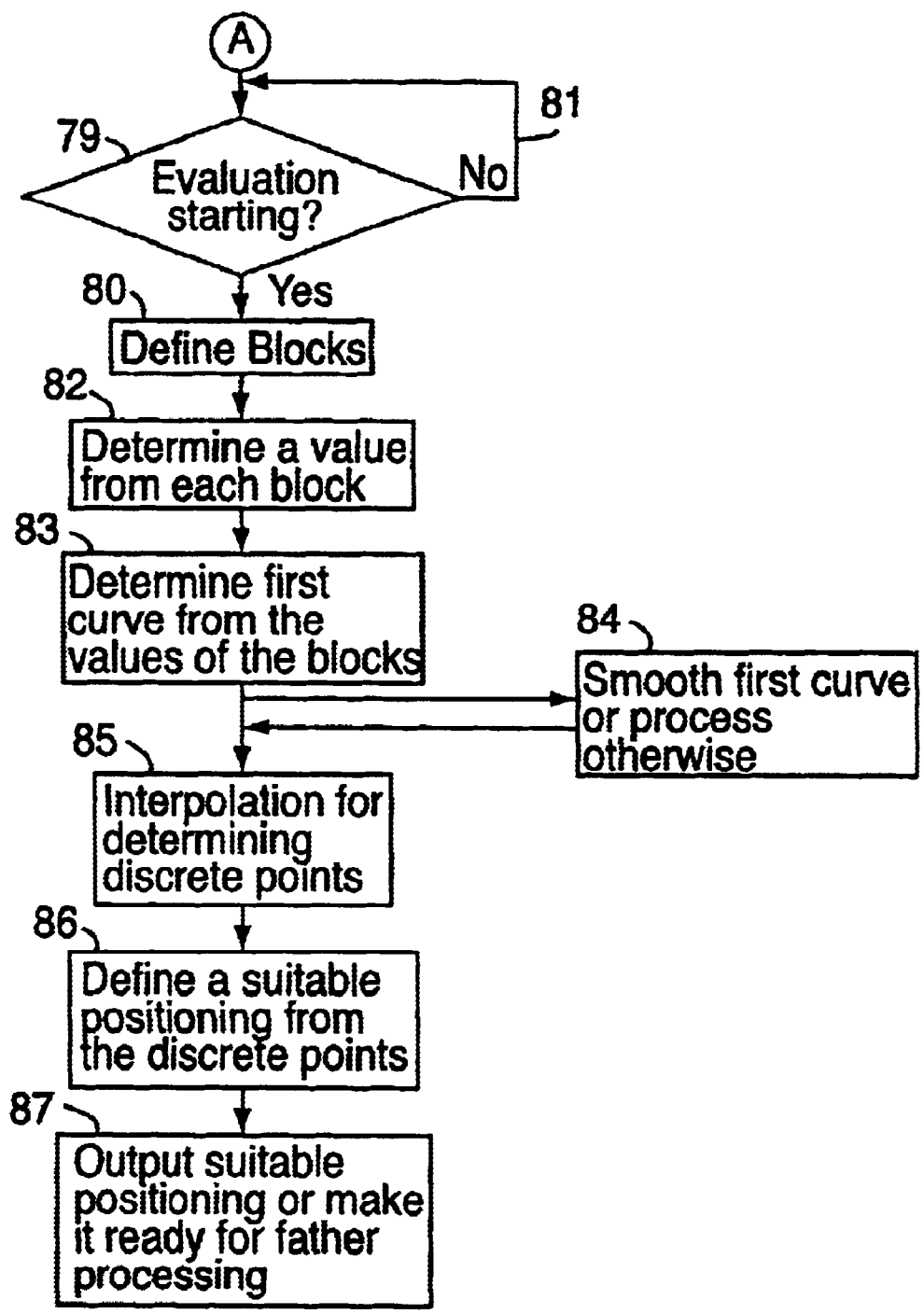
FIG. 7B, is a second portion of a flow diagram in accordance with the present invention.

The method in accordance with the invention will be explained in greater detail in what follows by means of a schematic flow diagram. The respective flow diagram is represented in FIGS. 7A and 7B. The method respectively starts (step 70) after a pair of gear wheels, which is intended to be newly measured/tested, has been inserted into the roll-off device. The method in accordance with the invention requires certain preconditions (characteristic values and/or parameters) for being able to perform a measurement. The appropriate characteristic values and/or parameters are either called out of a memory, or they can be input into the measuring system (step 71). It is also conceivable that a portion of characteristic values and/or parameters is downloaded from a memory, and that another portion is input by the operator of the device. Then the two gear wheels are brought into engagement and a starting point (step 72) is approached. This starting point is used as the initial point of the displacement process defined by the displacement vector $\vec{v}$ (t). At least one of the two gear wheels is now driven by means of a drive mechanism and is thereby caused to rotate (step 73). The respectively other gear wheel rolls off on the driven gear wheel.

After the pickup of the measuring signals (for example the signal SM(t), made available by a structure-borne sound sensor, and the signals from the angle encoders), the start takes place (step 74). In the course of acquiring the measuring signals, the position of the one gear wheel in relation to the position of the other gear wheel is changed in accordance with the displacement vector $\vec{v}$ (t) (step 75).

Depending on the measuring method, the steps 74 and 75 are performed once in the thrust mode and once in the traction mode. The corresponding branching in the flow diagram takes place in step 76. If, for example, the first measurement was taken in the traction mode, and if the user of the measuring system also wants to have a pass in the thrust mode, the method is branched in step 76 and follows the connection 77 back to the step 74. The change from traction to thrust (or vice versa) is performed beforehand in step 89.

The pickup of the measuring signals ends in step 78. The measured signals are customarily placed into a buffer storage. The continuation of the method is represented in FIG. 7B. Some of the steps shown in FIG. 7B can be performed parallel with the steps 74 to 78. The branch step 79 is intended to indicate that the evaluation can also take place at a later time. In this case the course would lead back over the branch 81 to the start of the evaluation.

In a first step 80, the determined time curve(s) is split up into blocks. The blocks can directly adjoin each other, can overlap each other or can divide the curve(s) into several independent segments (see FIG. 5, for example). Then in step 82, at least one value is preferably determined from each block. It is then possible to connect the respective values into a hypothetical curve by means of a computer (step 83).

The hypothetical curve determined in this way can be smoothed in an optional step 84 in order to improve the reproducibility of the evaluation.

An interpolation step 85 follows, which is used to determine several discrete point from the previously determined curved. One point of these discrete points is declared to be the suitable positioning (step 86). The suitable positioning is output or made available for further processing. For example, the position, together with the serial number and other characteristic features of the gear wheel pair, can be printed out in a measuring protocol. At the same time the positioning can be converted into the order for a suitable spacing disk. The order can be transmitted via a communications connection to a warehouse.

Figure 8:
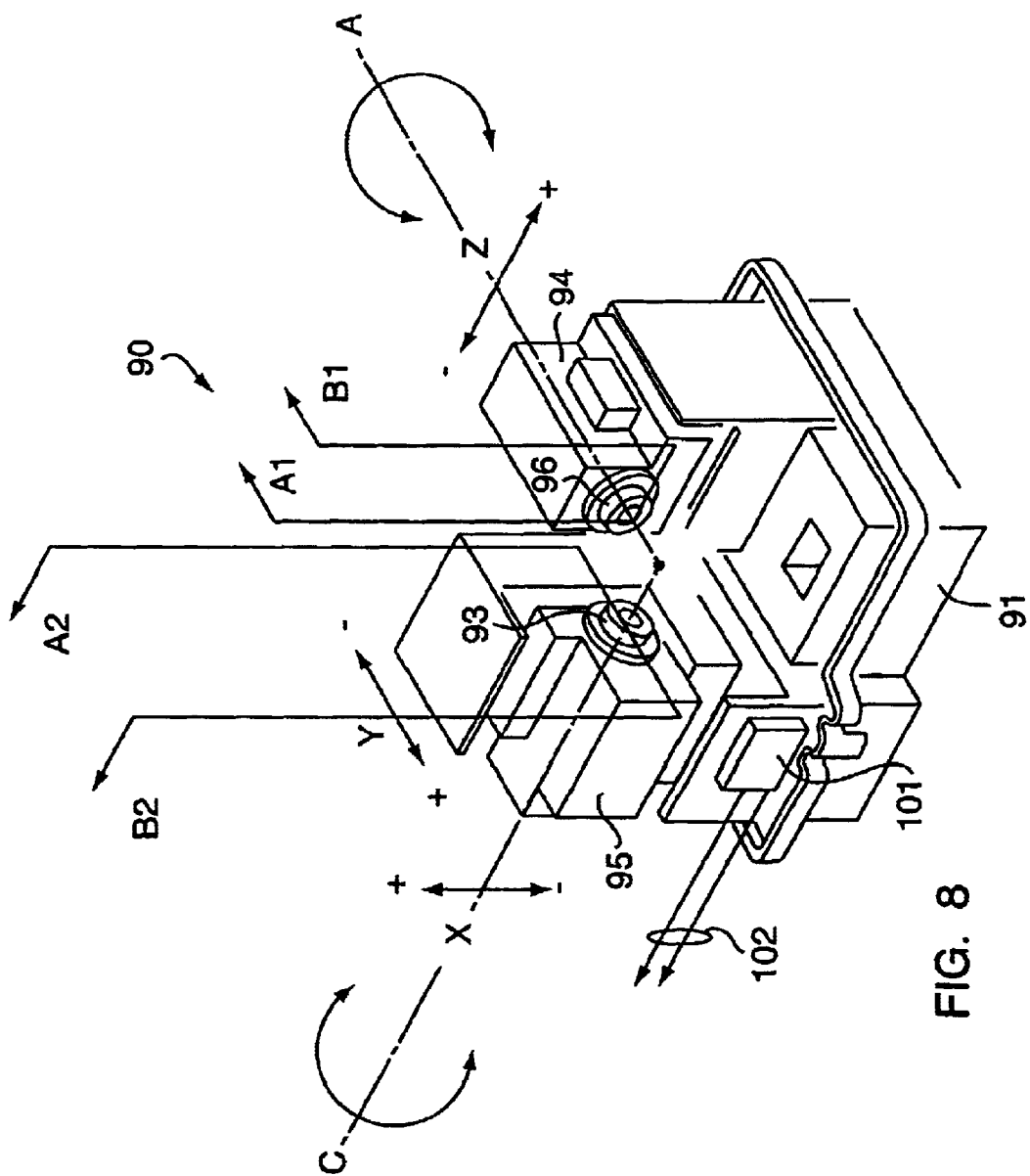
FIG. 8, is a perspective view of a roll-off device in accordance with the present invention, FIG. 9A, schematically illustrates a first software module in accordance with the present invention, FIG. 9B, schematically illustrates a second software module in accordance with the present invention.

An example of a roll-off device in accordance with the invention is represented in FIG. 8. The elements of the roll-off device 90 are mounted on a machine base 91. A ring gear to be tested (not represented) is mounted on the spindle 93. The spindle 93 is rotatably fastened on a rolling support 95, which is seated, displaceable in the direction of the two-headed arrows X and Y. In the example represented, the spindle 96 is rotatably fastened on a rolling support 94. The spindle 96 supports the pinion gear (not represented) to be tested. The pinion gear, as well as the ring gear, can be fastened on the spindles 96, or 93, in the customary manner by means of automatic clamping devices. The spindles 93 and 93 have drive mechanisms, whose number of revolutions can be changed in a continuously adjustable manner, and which cause the ring gear to rotate around the axis of rotation C, or the pinion gear around the axis of rotation A. The drive mechanism can be operated, for example, by the electronic regulating device of a control computer (not represented in FIG. 8). Further regulated drive mechanisms can be used for regulating the positioning of the ring gear in relation to the pinion gear. A regulated drive mechanism can, for example, displace the rolling support 95 (parallel with the two-headed arrows X and Y), and a drive mechanism can displace the rolling support 94 (two-headed arrow C). The mentioned drive mechanisms are known per se and therefore not represented in FIG. 8. The electrical switchgear cabinet with the control computer, which can be arranged in a manner known per se next to the roll-off device 90, is also not represented. An angle encoder is provided on each of the spindles 93 and 96. The angle encoders themselves are not represented in FIG. 8, but the two signal lines A1, B1 of the first angle encoder, and the two signal lines A2, B2 of the second angle encoder, which are connected with the evaluation unit, are represented. A structure-borne sound sensor 101 is fastened on the machine base 91 in the illustrated example. The two signal lines of a connecting line 102 are connected with the evaluation unit.

The testing method for determining a suitable mounting position of the pinion gear in relation to the ring gear can be performed in the roll-off device represented.

A further embodiment is distinguished in that it is possible to measure the structure-borne sound and the single-flank transmission error.

The evaluation method in accordance with the present invention can be designed in such a way that it is possible to preset various position-dependent tolerances, which are taken into account in the course of the evaluation.

Figure 9A:
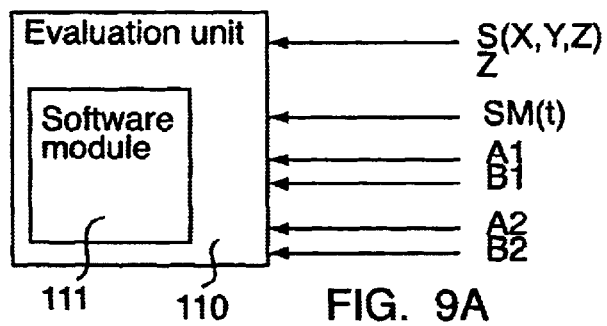

The evaluation unit 110 can advantageously contain a software module 111, which performs the evaluation of the measured values in agreement with the method of the invention. Such a software module 111 is schematically represented in FIG. 9A. The evaluation unit 110 receives the following signals for the evaluation: S(X,Y,Z), SM(t), and A1, B1, and A2, B2. The evaluation unit 110 preferably comprises an evaluation module (not represented) for receiving and processing signals.

Figure 9B:
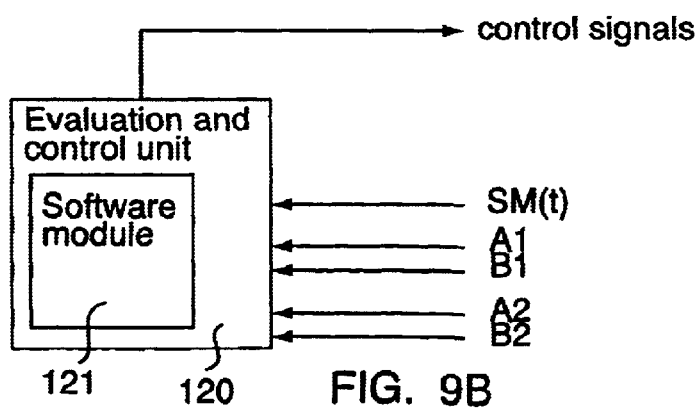

In a further embodiment, an evaluation and control unit 120 can contain a software module 121, which also takes on the control of the roll-off unit. In this case the entire process is controlled by this software module 121 and the results are also evaluated. The appropriate software module 121 can be seen in FIG. 9B. The evaluation and control unit 120 receives the following signals for the evaluation: SM(t), and A1, B1, and A2, B2, and controls the sequence control via the "control signals". The evaluation unit 120 preferably contains an evaluation module (not represented) for receiving and processing the signals. It is not necessary to provide the signal S(X,Y,Z) separately to the evaluation unit 120, since the evaluation unit 120 controls the roll-off device by means of the control signals and therefore already has the position information.

The software modules 111, or 121, preferably allow the prior provision of certain signal processing parameters for the analog input channels of the evaluation unit 110, or 120.

The present invention is particularly suited for quality monitoring/quality testing and testing of bevel wheel pairs. It can be employed, for example, in the automobile industry in the course of the production for the 100%-testing of bevel wheel gears. Such quality optimization processes become more and more important in order to achieve the quality demanded from the manufacturers with acceptable production costs.

The present invention can be a component of a test bed or a testing machine used in industrial manufacturing. The system in accordance with the invention can be integrated into a toothed wheel gear production, for example.

A system in accordance with the invention permits highly accurate and reproducible measurements and analyses of gear sets.

What is claimed is:

1. A system for testing a first gear wheel in connection with a second gear wheel, with a roll-off device, having
   a first spindle for the rotatable seating of the first gear wheel,
   a second spindle for the rotatable seating of the second gear wheel,
   a drive mechanism coupled to the first spindle for generating a rotary movement of the first gear wheel,
   a drive mechanism coupled to the second spindle for acting on the second gear wheel with a positive or negative torque,
   a displacement device coupled to the system for changing the positioning of the first gear wheel relative to the second gear wheel,
   a measurement pick-up device in communication with the roll-off device for monitoring operational characteristics of the first and second gear wheel,
   two angle encoders for transmitting information regarding the position of each of the first and second gear wheels,
   an evaluation unit that processes coordinate information ((S (X, Y, Z)) describing the position of the first gear wheel in relation to the second gear wheel,- and processes signals from the measurement pick-up device and signals from the two angle encoders,
   the roll-off device being controllable in such a way that various positionings of the first gear wheel in relation to the second gear wheel are passed,
   wherein the measurement pick-up device and the angle encoders continuously pick up signals in the course of this passage, and
   wherein the evaluation unit processes the continuously picked-up signals together with the coordinate information ((S(X, Y, Z)).

2. The system in accordance with claim 1, wherein the continuously picked-up signals are processed together with the coordinate information ((S (X, Y, Z)) in order to make possible statements regarding the suitable positioning of the first gear wheel in relation to the second gear wheel.

3. The system in accordance with claim 2, wherein the evaluation unit applies one or more predetermined algorithms in order to determine the suitable positioning from the coordinate information ((S(X, Y, Z)), and at least one of the signals from the angle encoders and the signal from the measurement pick-up device.

4. The system in accordance with claim 2, wherein the suitable positioning can be indicated by one or more of storing in memory, printing, and showing on a display unit.

5. The system in accordance with claim 1, wherein the measurement pick-up device senses structure-borne sound being generated in the course of the roll-off of the first gear wheel on the second gear wheel, and wherein the measurement pick-up device provides analog signals in accordance with the structure-borne sound.

6. The system in accordance with claim 1, wherein the angle encoders are designed for receiving single flank working error signals.

7. The system in accordance with claim 1, wherein the roll-off device includes means for bringing the first gear wheel into engagement with the second gear wheel.

8. The system in accordance with claim 1, wherein the positioning of the first gear wheel in relation to the second gear wheel is described by the coordinate information ((S(X, Y, Z)).

9. The system in accordance with claim 8, wherein the coordinate information ((S(X, Y, Z)) and the signal from the measurement pick-up device are brought into a chronological relationship with each other.

10. The system in accordance with claim 1, wherein changes in the positioning of the first gear wheel relative to the second gear wheel is defined by a displacement vector.

11. The system in accordance with claim 1, wherein the evaluation unit selects and evaluates a section from the signal from at least one of the measurement pick-up device and the signals from the angle encoders, and wherein this section is expressed in revolutions of one of the first and the second gear wheel.

12. The system in accordance with claim 1, wherein the measurement pick-up device picks up a continuous signal during a passage when the system is in a traction mode, and picks up a continuous signal during the passage when the system is in a thrust mode.

13. The system in accordance with claim 12, wherein the evaluation unit processes the continuous signal and then smooths it by the application of an algorithm.

14. The system in accordance with claim 1, wherein the first gear wheel is a ring gear and the second gear wheel a pinion gear.

15. The system in accordance with claim 1, wherein the roll-off device is a track control device.

16. The system in accordance with claim 15, wherein the number of revolutions of the first gear wheel and/or the second gear wheel can be predetermined by the track control device.

17. The system in accordance with claim 1, wherein the roll-off device is an SPS controller for controlling a roll-off process.

18. The system in accordance with claim 1, wherein the roll-off device is connected with the evaluation unit by means of a TCP/IP connection.

19. A method for testing a first gear wheel in connection with a second gear wheel, the method comprising the steps of:

providing a roll-off device, having a first spindle for the rotatable seating of the first gear wheel, a second spindle for the rotatable seating of the second gear wheel, a drive mechanism coupled to the first spindle for generating a rotary movement of the first gear wheel, a drive mechanism coupled to the second spindle for acting on the second gear wheel with a positive or negative torque, a displacement device coupled to the system for changing the positioning of the first gear wheel relative to the second gear wheel, a measurement pick-up device in communication with the roll-off device and having two angle encoders, and an evaluation unit, which processes coordinate information ((S(X, Y, Z)) describing the position of the first gear wheel in relation to the second gear wheel, processes signals from the measurement pick-up device and signals from the two angle encoders, the roll-off device being controllable in such a way that various positionings of the first gear wheel in relation to the second gear wheel are passed, wherein the measurement pick-up device and the angle encoders continuously pick up signals in the course of this passage, and wherein the evaluation unit processes the continuously picked-up signals together with the coordinate information ((S(X, Y, Z)) and displacing the first gear wheel relative to the second gear wheel in order to bring the two gear wheels into engagement and to set a starting point, driving the first gear wheel for putting it into rotation, wherein the second gear wheel rolls off on the first gear wheel, displacing the first gear wheel in relation to the second gear wheel along a displacement vector$^V$ (t), picking up an analog measuring signal describing the oscillation properties of the two gear wheels, picking up signals describing the rotational properties of the two gear wheels, determining a hypothetical curve by processing the analog measuring signal, of the signals describing the rotational properties, including the position information describing the position of the first gear wheel in relation to the second gear wheel, interpolating the hypothetical curve for determining suitable positioning.

20. The method in accordance with claim 19, wherein the analog measuring signal is derived from a measurement pick-up device for picking up structure-borne sound.

21. The method in accordance with claim 19, wherein one or several predetermined algorithms are being applied when determining the hypothetical curve in order to determine the suitable position from the position information, the analog measuring signal and/or the signals describing the rotational properties.

22. The method in accordance with claim 19, wherein a continuous curve is determined from at least one of the analog measuring signal and the signals describing the rotational properties.

23. The method in accordance with claim 19, wherein several sections are selected and evaluated from at least one of the analog measuring signal and the signals describing the rotational properties.

24. The method in accordance with claim 19, wherein pick-up of the signals takes place in one of the traction mode and the thrust mode.

25. The method in accordance with claim 19, wherein the hypothetical curve is smoothed by the application of an algorithm.

26. The method in accordance with claim 19, wherein the suitable positioning is memorized and printed out and shown on a display unit.

27. A system for testing a first gear wheel in connection with a second gear wheel, with a roll-off device, having a first spindle for the rotatable seating of the first gear wheel, a second spindle for the rotatable seating of the second gear wheel, a drive mechanism coupled to the first spindle for generating a rotary movement of the first gear wheel, a drive mechanism coupled to the second spindle for acting on the second gear wheel with a positive or negative torque, a displacement device coupled to the system for changing the positioning of the first gear wheel relative to the second gear wheel, a measurement pick-up device in communication with the roll-off device and having two angle encoders, and an evaluation unit, which processes coordinate information ((S(X, Y, Z)) describing the position of the first gear wheel in relation to the second gear wheel,
processes signals from the measurement pick-up device and signals from the two angle encoders,
the roll-off device being controllable in such a way that various positionings of the first gear wheel in relation to the second gear wheel are passed,
wherein the measurement pick-up device and the angle encoders continuously pick up signals in the course of this passage, and
wherein the evaluation unit processes the continuously picked-up signals together with the coordinate information ((S(X, Y, Z)) and further the evaluation unit interpolates characteristic values from at least one of the signal from the measurement pick-up device and the signals from the angle encoders at predetermined positions, which correspond to a defined positioning of the first gear wheel relative to the second gear wheel.

28. The system in accordance with claim 27, wherein in the course of the interpolation of the characteristic values the evaluation unit takes into consideration that the installed position of the first gear wheel in relation to the second gear wheel is predetermined by a finite number of spacing disks of a defined thickness.

29. A software module for use in an evaluation units for testing a first gear wheel in connection using an apparatus having a second gear wheel with a roll-off device, having a first spindle for the rotatable seating of the first gear wheel, a second spindle for the rotatable seating of the second gear wheel, a drive mechanism coupled to the first spindle for generating a rotary movement of the first gear wheel, a drive mechanism coupled to the second spindle for acting on the second gear wheel with a positive or negative torque, a displacement device coupled to the system for changing the positioning of the first gear wheel relative to the second gear wheel, a measurement pick-up device in communication with the roll-off device and having two angle encoders, and an evaluation unit, which processes coordinate information ((S(X, Y, Z)) describing the position of the first gear wheel in relation to the second gear wheel, processes signals from the measurement pick-up device and signals from the two angle encoders, the roll-off device being controllable in such a way that various positionings of the first gear wheel in relation to the second gear wheel are passed, wherein the measurement pick-up device and the angle encoders continuously pick up signals in the course of this passage, and wherein the evaluation unit processes the continuously picked-up signals together with the coordinate information ((S(X, Y, Z)), wherein the software module performs the following steps when the evaluation unit does the testing:
displacing the first gear wheel in relation to the second gear wheel in order to bring the two gear wheels into engagement and to set a starting point, driving the first gear wheel for puffing it into rotation, wherein the second gear wheel rolls off on the first gear wheel, displacing the first gear wheel in relation to the second gear wheel along a displacement vector $\vec{v}$ (t), picking up an analog measuring signal describing the oscillation properties of the two gear wheels, picking up signals describing the rotational properties of the two gear wheels, determining a hypothetical curve by processing the analog measuring signal, of the signals describing the rotational properties, including the position information describing the position of the first gear wheel in relation to the second gear wheel, interpolating the hypothetical curve for determining suitable positioning.

30. An evaluation unit for testing a first gear wheel in connection with a second gear wheel, having a computer and a software module which performs the following steps when the computer does the testing:
displacing the first gear wheel in relation to the second gear wheel in order to bring the two gear wheels into engagement and to set a starting point,
driving the first gear wheel for putting it into rotation, wherein the second gear wheel rolls off on the first gear wheel,
displacing the first gear wheel in relation to the second gear wheel along a displacement vector $\vec{v}$ (t),
picking up an analog measuring signal describing the oscillation properties of the two gear wheels,
picking up signals describing the rotational properties of the two gear wheels,
determining a hypothetical curve by processing the analog measuring signal, of the signals describing the rotational properties, including the position information describing the position of the first gear wheel in relation to the second gear wheel,
interpolating the hypothetical curve for determining suitable positioning.

31. A system for testing a first gear wheel in connection with a second gear wheel, with a roll-off device, having
a first spindle for the rotatable seating of the first gear wheel,
a second spindle for the rotatable seating of the second gear wheel,
a drive mechanism coupled to the first spindle for generating a rotary movement of the first gear wheel,
a drive mechanism coupled to the second spindle for acting on the second gear wheel with a positive or negative torque,
a displacement device coupled to the system for changing the positioning of the first gear wheel relative to the second gear wheel,
a measurement pick-up device in communication with the roll-off device and having two angle encoders, and an evaluation unit, which
processes coordinate information ((S(X, Y, Z)) describing the position of the first gear wheel in relation to the second gear wheel,
processes signals from the measurement pick-up device and signals from the two angle encoders,
the roll-off device being controllable in such a way that various positionings of the first gear wheel in relation to the second gear wheel are passed,
wherein the measurement pick-up device and the angle encoders continuously pick up signals in the course of this passage, and
wherein the evaluation unit processes the continuously picked-up signals together with the coordinate information ((S(X, Y, Z)) by means of a computer.

32. A system for testing a first gear wheel in connection with a second gear wheel, with a roll-off device, having
a first spindle for the rotatable seating of the first gear wheel,
a second spindle for the rotatable seating of the second gear wheel,
a drive mechanism coupled to the first spindle for generating a rotary movement of the first gear wheel, a drive mechanism coupled to the second spindle for acting on the second gear wheel with a positive or negative torque, a displacement device coupled to the system for changing the positioning of the first gear wheel relative to the second gear wheel, a measurement pick-up device in communication with the roll-off device and having two angle encoders, and an evaluation unit, which processes coordinate information ((S(X, Y, Z)) describing the position of the first gear wheel in relation to the second gear wheel, processes signals from the measurement pick-up device and signals from the two angle encoders, the roll-off device being controllable in such a way that various positionings of the first gear wheel in relation to the second gear wheel in both fraction mode and thrust mode are passed, wherein the measurement pick-up device and the angle encoders continuously pick up signals in the course of these passages, and wherein the evaluation unit processes the continuously picked-up signals together with the coordinate information ((S(X, Y, Z)) and then smooths it by the application of an algorithm.

* * * * *

UNITED STATES PATENT AND TRADEMARK OFFICE
CERTIFICATE OF CORRECTION

PATENT NO. : 6,655,205 B2  
DATED : December 2, 2003  
INVENTOR(S) : Bartelt et al.

Page 1 of 1

It is certified that error appears in the above-identified patent and that said Letters Patent is hereby corrected as shown below:

Title page,
Item [57], ABSTRACT,
Line 3, please delete the word "roll-of" and substitute -- roll-off --.

Column 13,
Line 54, please delele the word "puffing" and substitute -- putting --.

Column 16,
Line 3, please delete the word "franction" and substitute -- traction --.

Signed and Sealed this

Eighteenth Day of January, 2005

JON W. DUDAS
*Director of the United States Patent and Trademark Office*